(12) United States Patent
Toyama et al.

(10) Patent No.: US 6,992,665 B2
(45) Date of Patent: Jan. 31, 2006

(54) METHOD AND DEVICE FOR FITTING SURFACE TO POINT GROUP, MODELING DEVICE, AND COMPUTER PROGRAM

(75) Inventors: Osamu Toyama, Kakogawa (JP); Shinichi Horita, Osaka (JP); Eiro Fujii, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 854 days.

(21) Appl. No.: 09/816,405

(22) Filed: Mar. 26, 2001

(65) Prior Publication Data
US 2002/0013683 A1    Jan. 31, 2002

(30) Foreign Application Priority Data

| Mar. 29, 2000 | (JP) | ............................. 2000-090629 |
| Jun. 30, 2000 | (JP) | ............................. 2000-197778 |
| Jun. 30, 2000 | (JP) | ............................. 2000-197779 |

(51) Int. Cl.
*G06T 15/00* (2006.01)

(52) U.S. Cl. ..................................... 345/419; 345/473

(58) Field of Classification Search ................ 345/473, 345/474, 475, 419, 420
See application file for complete search history.

(56) References Cited

U.S. PATENT DOCUMENTS

| 4,654,795 | A  | * | 3/1987 | Shimoni ................. 250/363.07 |
| 6,301,496 | B1 | * | 10/2001 | Reisfeld ..................... 600/407 |
| 6,504,546 | B1 | * | 1/2003 | Cosatto et al. .............. 345/473 |
| 6,580,811 | B2 | * | 6/2003 | Maurer et al. .............. 382/103 |
| 6,697,072 | B2 | * | 2/2004 | Russell et al. .............. 345/474 |
| 6,831,603 | B2 | * | 12/2004 | Menache .................... 342/463 |

FOREIGN PATENT DOCUMENTS

| JP | 5-81377 | 4/1993 |
| JP | 6-52289 | 2/1994 |
| JP | 6-118349 | 4/1994 |
| JP | 8-77389 | 3/1996 |

* cited by examiner

*Primary Examiner*—Phu K. Nguyen
(74) *Attorney, Agent, or Firm*—McDermott Will & Emery LLP

(57) ABSTRACT

The present invention provides a method for fitting a surface to a point group using computer. The method enables to prevent an improper modification or an erroneous modification even when the point group includes a point having a low reliability, thus to achieve proper modification. The method comprises a first step for judging reliability of each of points composing the point group and a second step for changing the method for fitting the surface to the point group based on the result of judgment of the first step. In the second step, the method for fitting is changed by varying weights of the points based on the reliabilities.

17 Claims, 17 Drawing Sheets

F I G. 1 0
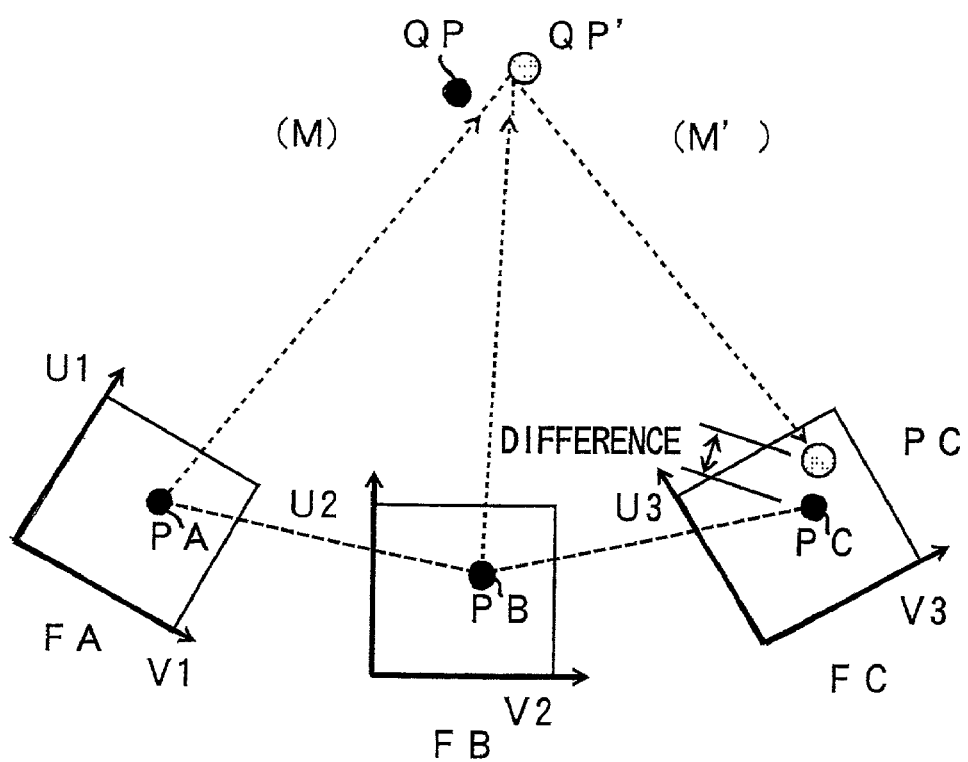

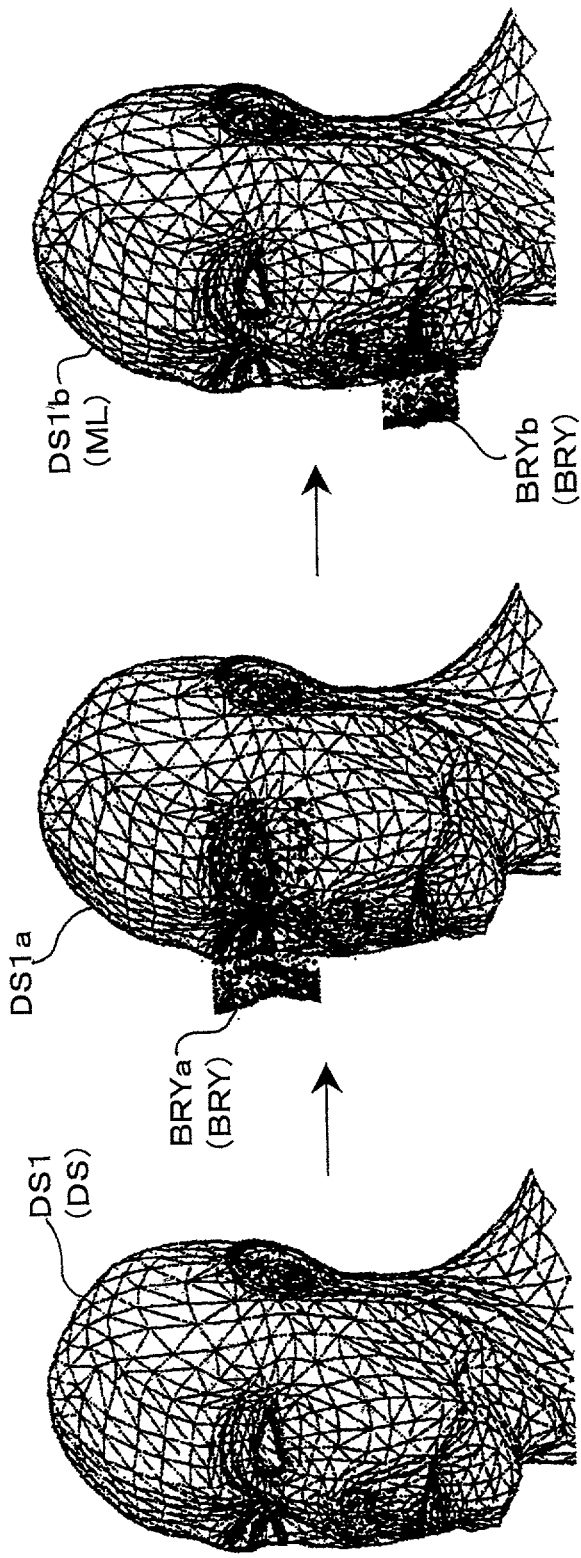

F I G. 1 3
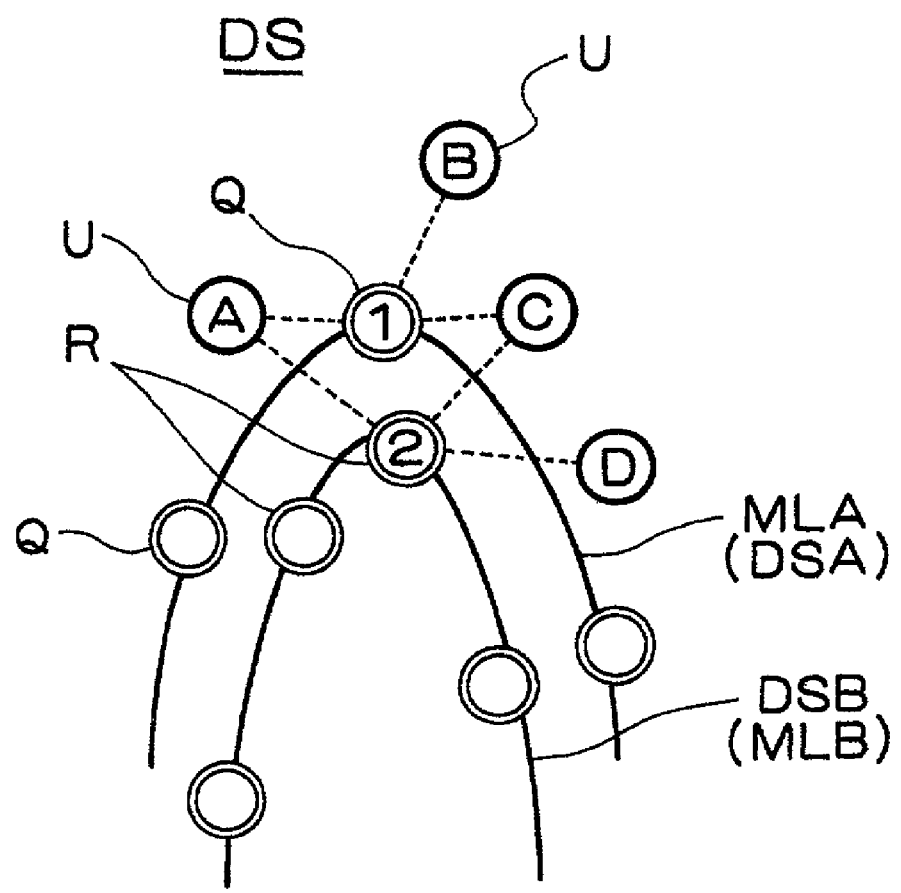

F I G. 1 5
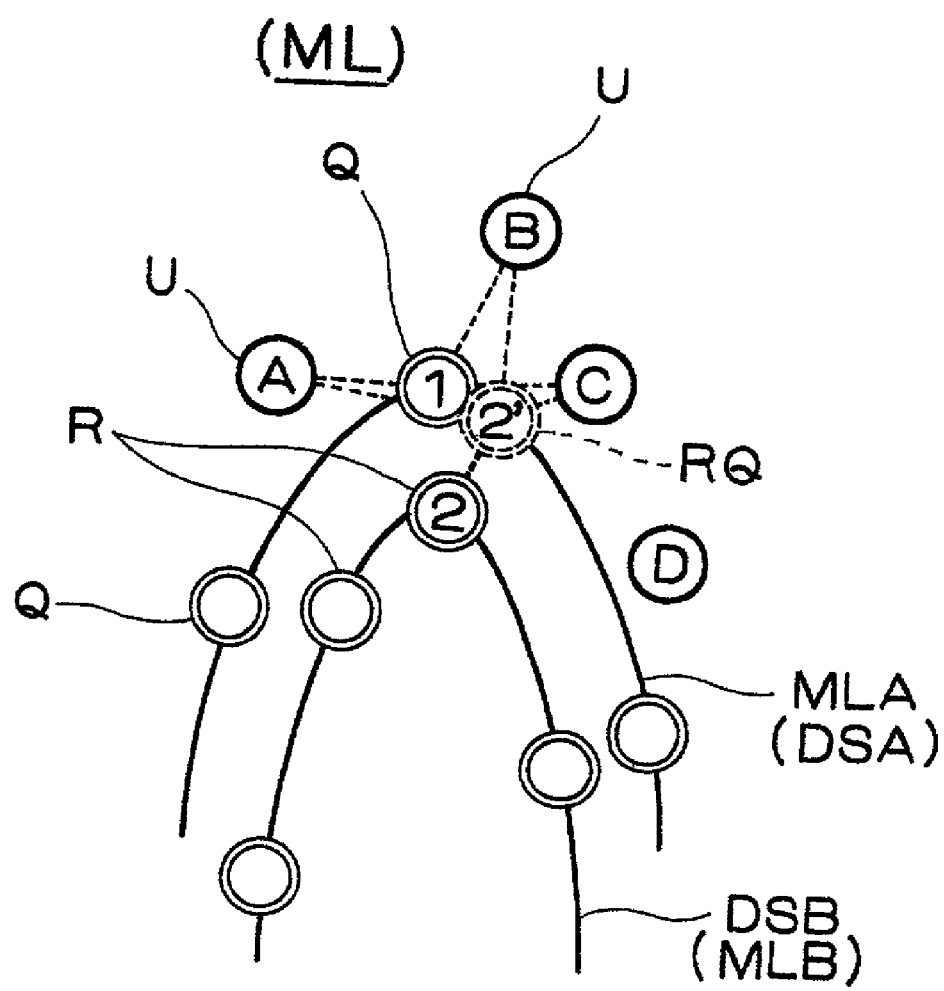

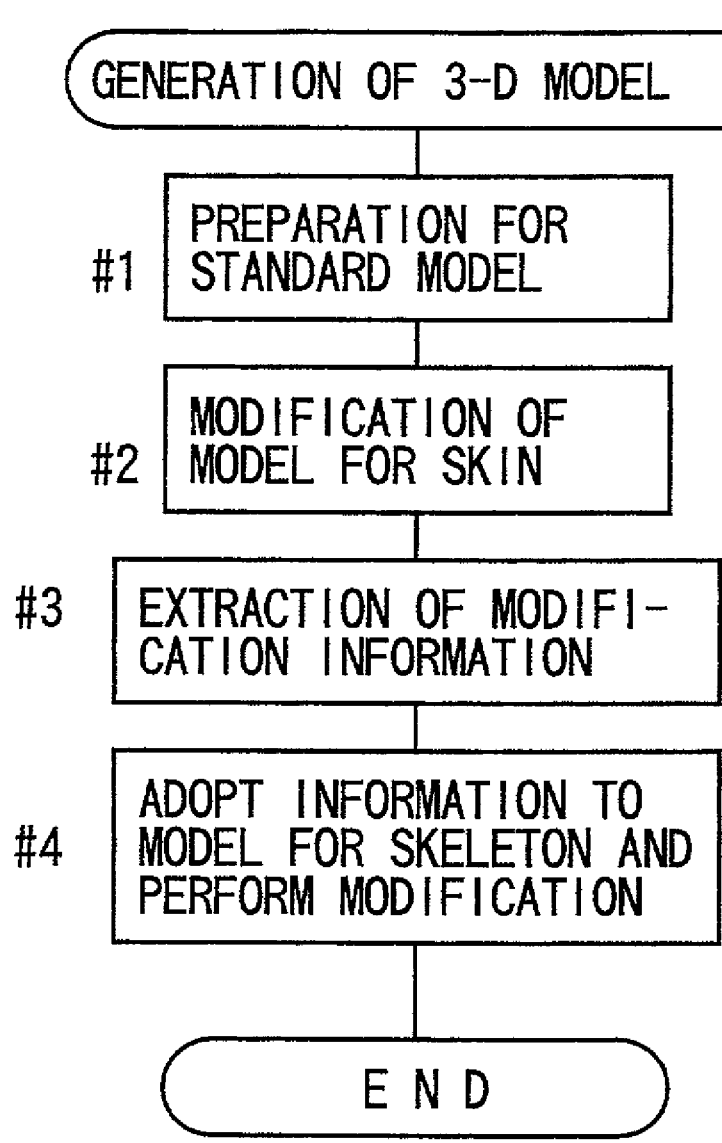

METHOD AND DEVICE FOR FITTING SURFACE TO POINT GROUP, MODELING DEVICE, AND COMPUTER PROGRAM

This application is based on Japanese patent applications Nos. 2000-090629, 2000-197778 and 2000-197779 filed in Japan, the contents of which are hereby incorporated by reference.

BACKGROUND OF THE INVENTION

1. Field of the Invention

The present invention relates to a method and a device for fitting a surface to a point group, a modeling device and a computer program. The present invention is useful in the field of computer graphics such as generation of a three-dimensional model, etc.

2. Description of the Prior Art

In recent years, the three-dimensional CG (three-dimensional computer graphics) technique is often used in the fields of movie, game and so on. In the three-dimensional CG, a three-dimensional model, light source, etc. are located and moved in a virtual three-dimensional space; therefore, the three-dimensional CG is high in the degree of freedom of expression.

Conventionally, a non-contact three-dimensional measurement device employing the light-section method has been put into practical use. Three-dimensional data of an object can be relatively easily obtained by using such non-contact three-dimensional measurement device. However, various problems have been detected in using the three-dimensional data obtained by means of the non-contact three-dimensional measurement device as it is for three-dimensional CG. For example, it is necessary to reduce the amount of data obtained by the measurement by a process of thinning the data, which is complicated and time-consuming.

To solve the above problems, there has been proposed a method wherein a standard model is prepared for an object and the standard model is modified according to three-dimensional data of the object obtained by an actual measurement of the object (Japanese Unexamined Patent Publication No. 5-81377).

In the above-mentioned method, three-dimensional form information of the three-dimensional data obtained by the measurement, i.e., a point group in the three-dimensional space, is used as an object for fitting, and a surface of the standard model is fitted on the three-dimensional point group. According to the method, it is possible to obtain three-dimensional data or a three-dimensional model free from defects even in the case where the three-dimensional data originally had defects.

However, a satisfactory result is not yet achieved by the above method, since, in modifying the surface simply according to the point group obtained by the measurement, the surface is unavoidably fitted to some false points included in the point group, which are low in reliability.

Specifically, as shown in FIG. 19A, in the case where the points P3 to P6 among the six points P1 to P6 are low in reliability, the surface S is modified according to all the points P1 to P6. The surface Sa obtained by the modification is not always satisfactory or proper.

Further, as shown in FIG. 19B, in the case where points P3 to P6, which are low in reliability, are ignored and reliable points P1 and P2 are used, the modification itself cannot be fully achieved with failing to reflect and maintain a form of an object represented by the point group. The surface Sb obtained by the incomplete modification is hardly a proper representation of the form of the object.

The three-dimensional model obtained by the above-mentioned method is frequently utilized in the field of animation. In the field of animation, not only a skin model which is external and visible for human eyes, but also a skeleton model or a muscle model (muscle information) which moves the skin model as lying thereunder is utilized.

However, since the three-dimensional data obtained by measurement of an object corresponds to the skin model, it is impossible to generate the skeleton model or the like from the three-dimensional data as it is.

Further, in the case of adopting modification information of a skin model as it is for generating a skeleton model based on the three-dimensional data of the object, it is possible that the skeleton model is improperly modified due to the difference between the skin model and the skeleton model.

Although a general form of an object can be reproduced according to the above method, it is difficult to reproduce topical characteristics of a form of the object.

For example, in the case of making a three-dimensional model of a human head according to the above method, although general form of the resulting three-dimensional model conforms to an object for measurement, i.e., the human head, parts that influences much for expression of the face such as eyes, mouth and the like do not satisfactorily conform to those of the object. Thus, there have been problems relating to the representation of delicate expressions of human.

SUMMARY OF THE INVENTION

An object of the present invention is to prevent improper modification or erroneous modification that is caused by a point of low-reliability and to perform proper fitting even when a point of low-reliability is included in a point group.

Another object of the present invention is to generate a form model such as a skin model, skeleton model and the like by modifying a model for skin, a model for skeleton and the like with fitting using measurement data obtained by measuring an object.

Another object of the present invention is to have parts of a three-dimensional model such as a corner of an eye or a corner of a mouth conformed to that of an object without topical improper modification.

According to one embodiment of the present invention, there is provided a method for fitting a surface to a point group by using a computer which comprises a first step of judging reliability of the point group and a second step of changing the method for fitting the surface to the point group based on the judgment result obtained in the first step.

Preferably, the first step may comprise judging reliability of each of points composing the point group, and the second step may comprise changing the method for fitting the surface to the point group by varying weight of each of the points based on reliability of each of the points.

According to another embodiment of the present invention, there is provided a processor comprising an obtaining section for obtaining original data generated by measurements, a first modifying section for modifying, based on the original data, a first standard model which has been prepared separately from the obtaining of the original data and a second modifying section for modifying a second standard model based on the result of modification of the first standard model.

Preferably, the first standard model may be a model for skin, the second standard model may be a model for skeleton or a model for muscle and the original data may be data whose object is a surface of a human head.

According to a more preferable embodiment of the present invention, there is provided a device for modifying a surface based on a three-dimensional point group comprising a selecting section for selecting a plurality of partial areas from the point group and a modifying section for modifying the surface based on the point group of each of the selected partial areas.

These and other characteristics and objects of the present invention will hereinafter be described in detail by the following preferred embodiments.

BRIEF DESCRIPTION OF THE DRAWING

FIG. 10 shows an example of the method of obtaining three-dimensional data and reliability data of an object.

FIG. 12 shows an example of the method of performing modification of a standard model using a partial area.

FIG. 13 shows relationship between a model for skin and a model for skeleton with respect to construction points and control points.

FIG. 15 is another example of the method of correcting a control point.

FIG. 17 is a flow chart showing a process of generation of a three-dimensional model by modifying two models.

DESCRIPTION OF THE PREFERRED EMBODIMENTS

Figure 1:
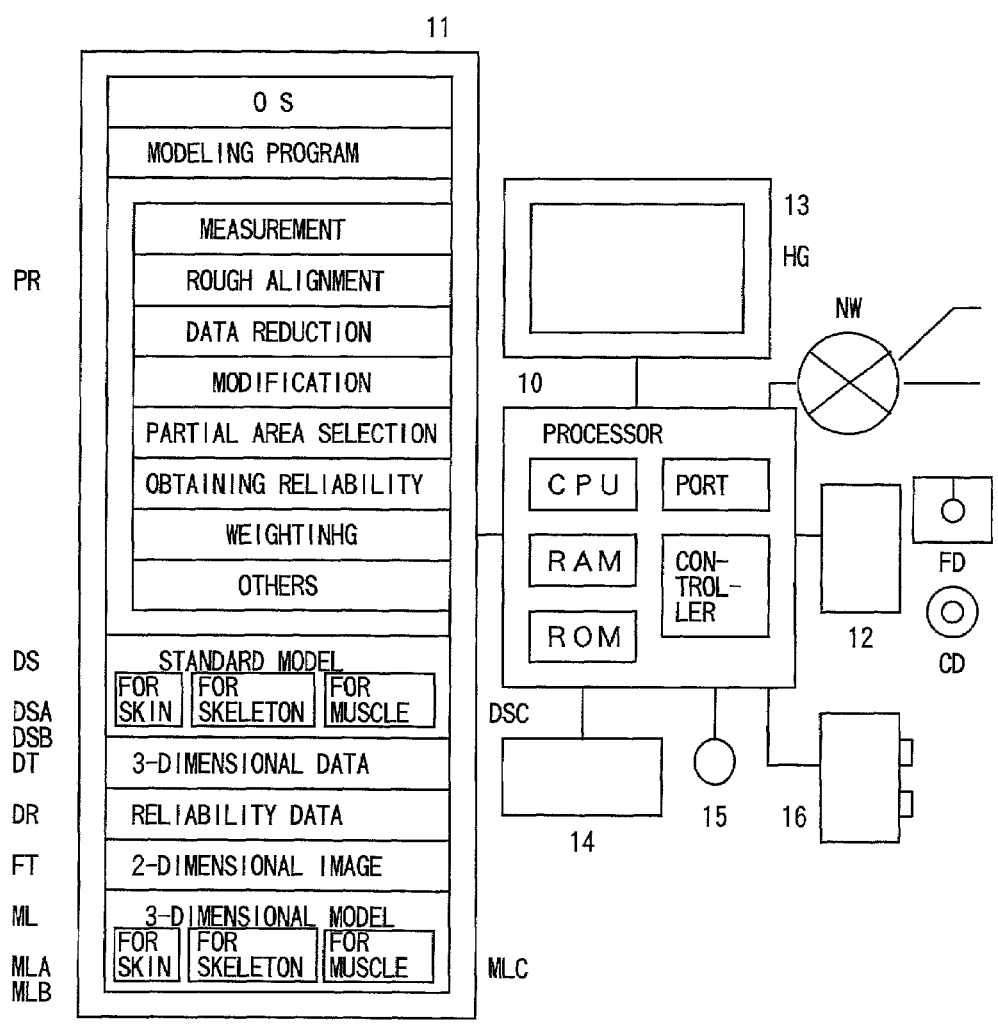
FIG. 1 is a block diagram showing the modeling device according to an embodiment of the present invention.

FIG. 1 is a block diagram showing a modeling device 1.

The present embodiment illustrates an example of modifying a standard model based on measurement data (three-dimensional data or two-dimensional data) of a human head, i.e., an example of generating a three-dimensional model of a human head by fitting.

The modeling device 1 generates a three-dimensional model such as a skin model and a skeleton model by modifying a standard model such as a model for skin, a model for skeleton and the like. Explanations for the generation of the skin model and the generation of the skeleton model are given below in this order.

(Generation of Skin Model)

Referring to FIG. 1, the modeling device 1 comprises a processor 10, a magnetic disk unit 11, a media drive unit 12, a display 13, a key board 14, a mouse 15, a three-dimensional measuring unit 16 and so on.

The processor 10 comprises a CPU, a RAM, a ROM, a video RAM, an input and output port, various controllers and so on. The CPU executes programs stored in the RAM, the ROM, etc., so that various functions are realized on the processor.

Stored in the magnetic disk unit 11 are an OS (Operating System), a modeling program PR for generating a three-dimensional model ML, other programs, a standard model (standard model data) DS, three-dimensional data (three-dimensional measurement data) DT, reliability data DR which indicate reliability of the three-dimensional data DT, a two-dimensional image (two-dimensional measurement data) FT, a generated three-dimensional model ML, other data and so on.

Figure 14:
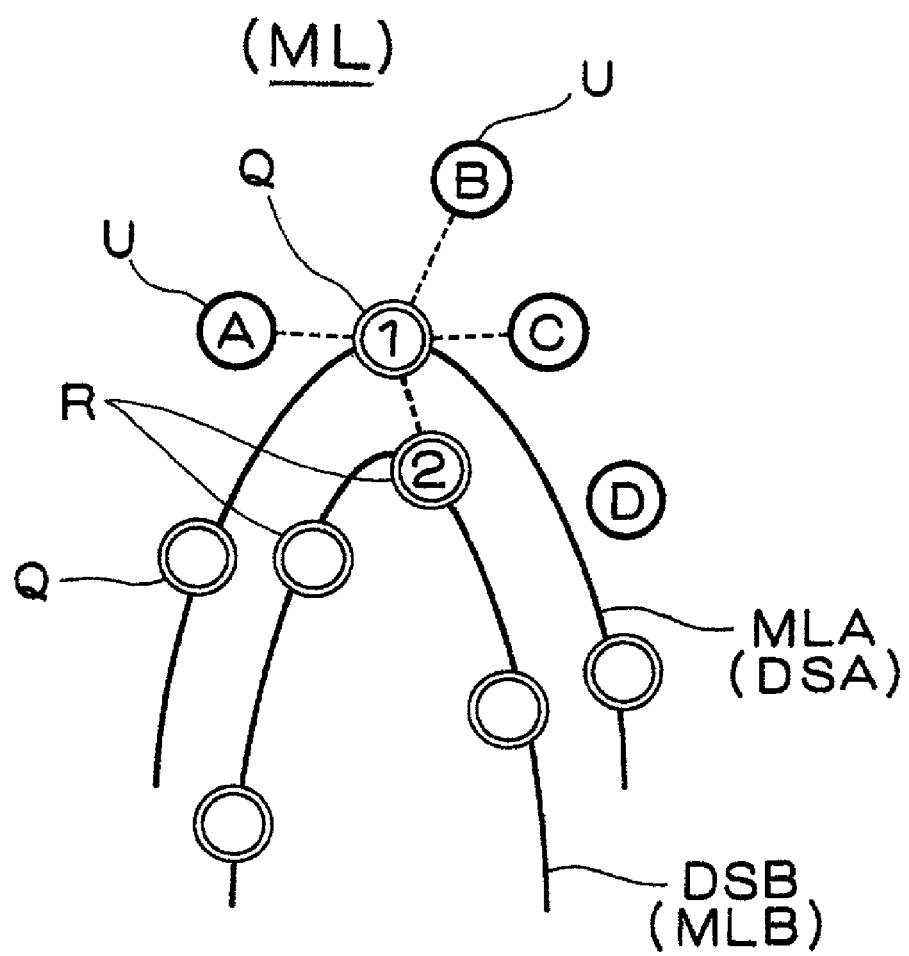
FIG. 14 is an example of a method of correcting a control point.

The standard model DS includes a model for skin DSA, a model for skeleton DSB and a model for muscle (information of muscle) DSC (see FIG. 14). Common control points are set for the model for skin DSA, the model for skeleton DSB and the model for muscle DSC for a single standard model. Therefore, if the control points move to modify the model for skin DSA, for example, based on the measurement data, the model for skeleton DSB and the model for muscle DSC both are modified according to the movement of the control points.

These programs and data are loaded on the RAM of the processor 10 as required.

The modeling program PR includes a measurement process, rough alignment, a data reduction process, a modification process, a partial area selection process, a reliability obtaining process, a weighting process and programs for other processes.

In the modification process, fitting of a surface S of the standard model DS is performed in order to minimize distances between the surface S and respective points of the three-dimensional data DT. Degree of the fitting differs according to a weight of each of points. In the weighting process, the process required for the weighting in the modification process such as a process of determining the weights using the reliability data DR.

The media drive unit 12 is adapted to access a recording medium such as a DC-ROM (CD), a floppy disk FD or an optical magnetic disk to read and write data or program. Proper driving unit is used depending on the type of the recording medium. The modeling program PR can be installed from the recording medium. It is also possible to input the standard model DS, three-dimensional data DT, reliability data DR, two-dimensional image FT and the like via the recording medium.

Displayed on a display screen HG of the display 13 are above-mentioned various data, the three-dimensional model ML generated by the modeling program PR, other data and images.

The key board 14 and the mouse 15 are used for inputting data or issuing command to the processor 10.

The three-dimensional measuring unit 16 serves to obtain three-dimensional data DT of an object by, for example, the light-section method. It is possible to obtain three-dimensional data DT directly by the three-dimensional measuring unit 16, while it is also possible to obtain three-dimensional data DT indirectly by performing operations in the processor 10 or the like based on data output from the three-dimensional measuring unit 16.

In the course of obtaining three-dimensional data DT of an object, it is possible to obtain two-dimensional data FT of the object on the same visual line as that of the three-dimensional data DT when so required. A known device such as that disclosed in Japanese Unexamined Patent Publication No. 10-206132 can be used as the three-dimensional measuring unit 16.

Another known method for obtaining three-dimensional data DT of an object is a method wherein a plurality of cameras is located with parallax for an object. Specifically, the three-dimensional data DT is obtained by computing a plurality of images with parallax captured by the cameras and using the stereophotography method.

In the above method, data for judging reliability of respective points of the three-dimensional data DT can be obtained by using three cameras.

More specifically, an object is captured by three cameras to obtain three images, and points corresponding to the three images are determined. The three-dimensional data DT is then obtained from a known calculation based on the corresponding point of two images. Another image is utilized for obtaining the reliability data DR.

For example, as shown in FIG. 10, three-cameras A, B, and C capture the object Q to obtain three images FA, FB and FC. Image planes (Un, Vn; n=1, 2, 3) are indicated for the images FA, FB and FC. The point QP on the object Q in the three-dimensional space M is projected on each of the points PA, PB and PC of the image planes.

Here, if the relationship of the points PA, PB and PC is determined, the three-dimensional space M can be reconstructed from the relationship. In the three-dimensional space M', the point QP' which corresponds to the points PA and PB is determined. Logically, the point PC' obtained by reversal projection of the QP' in the three-dimensional space M' on the image plane (U3, V3) is identical to the point PC obtained by projecting the point QP in the three-dimensional space M on the image plane (U3, V3).

However, since it is difficult to precisely determine the projection conversion and the relationship, the points typically are not identical to each other. Therefore, the difference between the point PC and the point PC' is used as an index for the reliability.

For example, the difference between the point PC and the point PC' may be indicated by number of different pixels. If the point PC and the point PC' are on the same pixel, the difference is "0". If the points are different to each other with respect to one pixel, the difference is "1"; and if the points are different with respect to two pixels, the difference is "2". The number of different pixels can be used as the reliability data DR.

The reliability data DR may be judged by other methods such as that disclosed in Japanese Unexamined Patent Publication No. 61-125686.

The modeling device 1 may be provided by using a personal computer, a workstation or the like. It is possible to obtain the program and data mentioned above by receiving them via a network NW.

Figure 2:
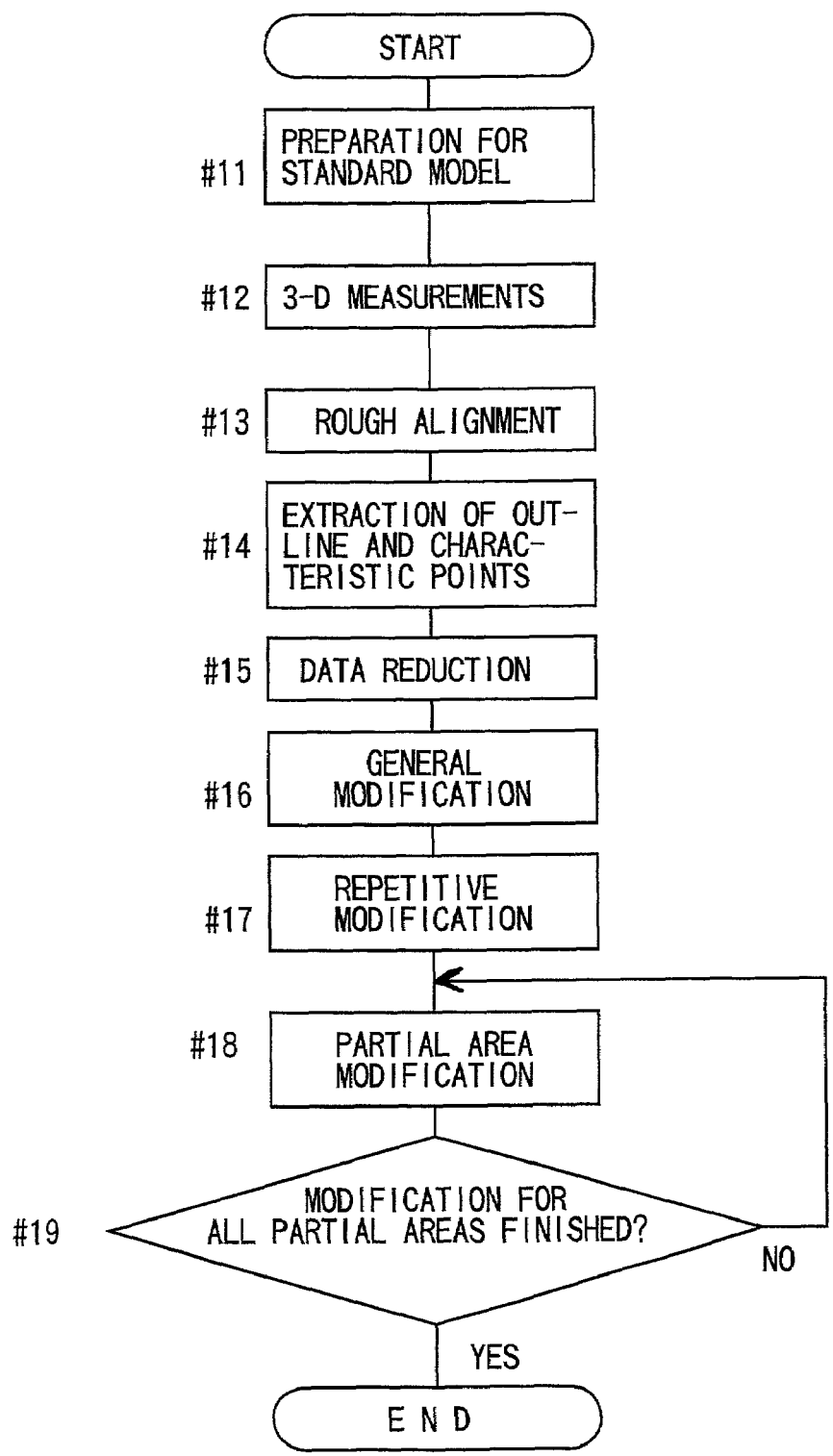
FIG. 2 is a flow chart showing the general process of the modeling device.

Hereafter, general flow of process in the modeling device will be illustrated with reference to the flowchart. (Preparation for Standard Model) Referring to FIG. 2, a standard model of an object is prepared as a start (#11). Since the object is a human head in the present embodiment, a standard model that is most resembles to the object is chosen among a plurality of standard models having various sizes and forms to be a standard model DS1.

The standard model may be either a three-dimensional form model or a three-dimensional shape model defined by polygons or a three-dimensional form model or a three-dimensional shape model defined by free-form surfaces. In the case where the standard model is the three-dimensional form model defined by polygons, the standard model has a form depending on three-dimensional coordinates of vertexes of the polygons. In the case where the standard model is the three-dimensional form model defined by free-form surfaces, the standard model has a form depending on functions that define the free-form surfaces and coordinates of control points.

Further, in the case where the standard model is the three-dimensional form model defined by polygons, the vertex of polygon is referred to as "construction point" in this specification.

A point used for modifying a standard model in fitting the standard model is referred to as "control point" in this specification. Allocations of the control point and the construction point are arbitrary, and the control point may be set either on a surface of a polygon or away from a surface of a polygon. Single control point is associated with a plurality (about 3 to 100) of construction points, so that the associated construction points move in accordance with movement of the single control point. A plurality of the control points are moved to modify whole parts of the standard model in fitting the standard model. In the case where the three-dimensional form model is defined by free-form surfaces, allocation of control points to be used for fitting is arbitrary.

The control points are located at a high density at a part having a delicate form such as a corner of an eye and an edge of a lip or a part having a steep and jagged form such as the nose and lips. The control points are located uniformly at other parts.

On the standard model, there are set outlines and a characteristic point as viewed from one direction. The outlines are set for the eyes, nose, mouth, jaw and the like, respectively. Examples of the outlines include an eyelid outline, a nose outline, a lip outline, a jaw outline and the like. Examples of the characteristic points include corners of the eyes or mouth, top of the nose, bottom of the jaw and like parts that actually are characteristic and parts which are not characteristic but can easily be specified as being at an intermediate part of the characteristic parts.

Figure 4:
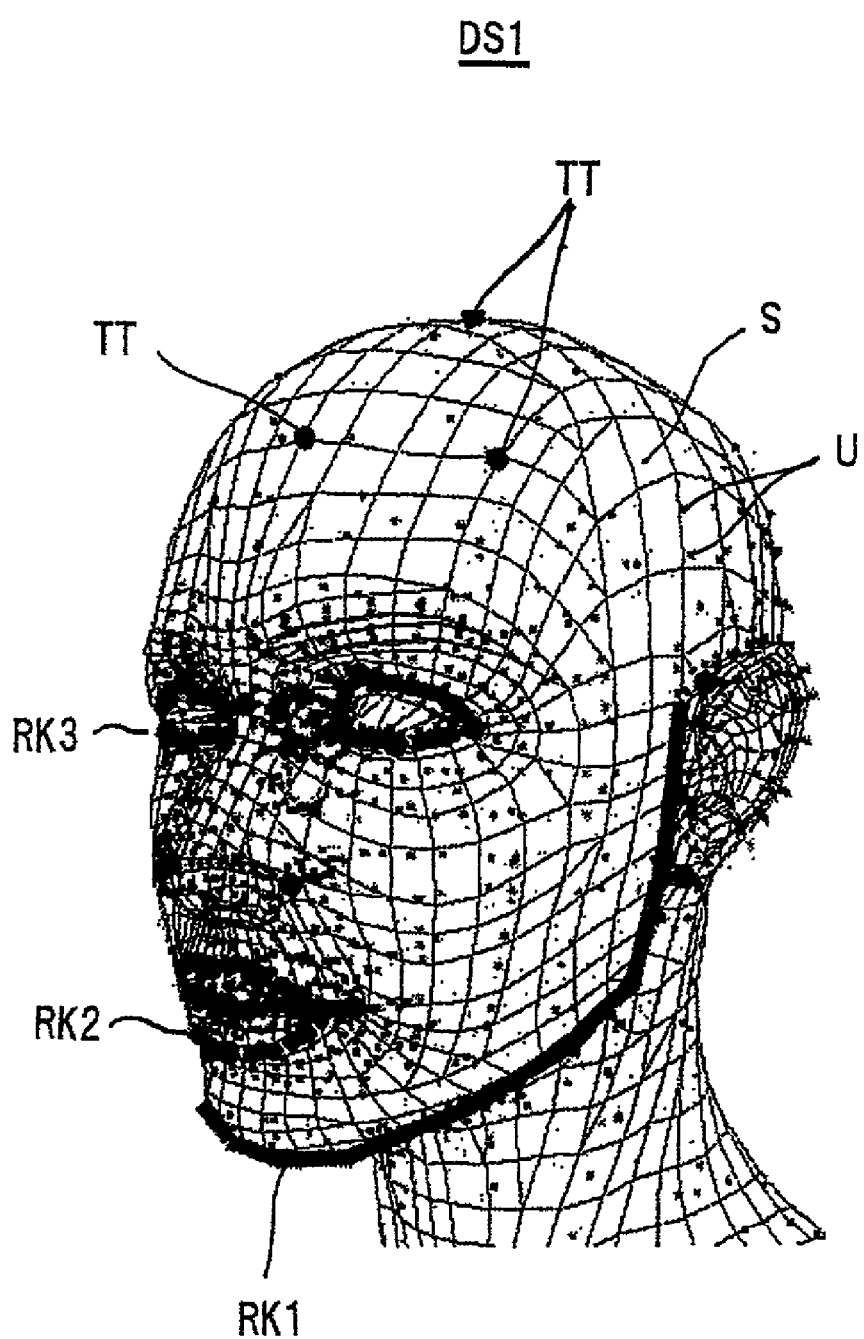
FIG. 4 shows an example of the standard model.

Referring to the standard model DS1 shown in FIG. 4, RK1 denotes the jaw outline, RK2 denotes the lip outline and RK3 denotes the eyelid outline. As shown in FIG. 4, the outline RK1 is a boundary when the standard model DS1 is viewed from one direction. Only a part of the characteristic points TT of the standard model DS1 is shown in FIG. 4.

(Obtaining of Three-Dimensional Data)

The three-dimensional data DT is obtained by performing three-dimensional measurements of an object (#12). As mentioned above, at the same time with obtaining the three-dimensional data, two-dimensional image, reliability data for indicating reliabilities of points of the three-dimensional data and information for obtaining the reliability data.

Figure 5:
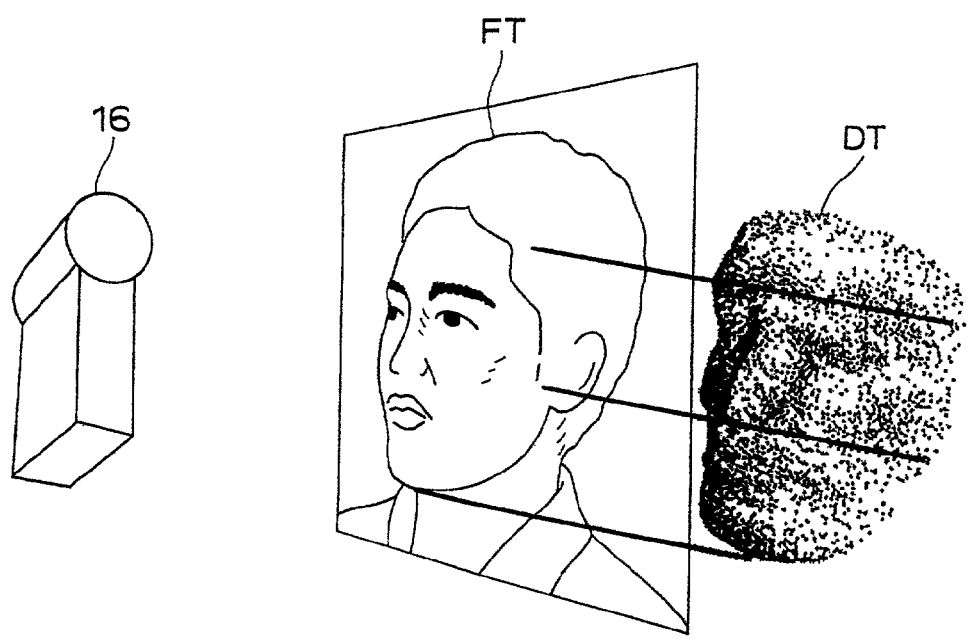
FIG. 5 shows an example of the obtaining of three-dimensional data from an object.

Referring to FIG. 5, head of a person is measured (captured) as an object by using the three-dimensional measuring unit 16, to thereby obtain the three-dimensional data and the two-dimensional image.

The reliability data can be obtained by the reliability obtaining process of the modeling program. The three-dimensional data and/or the two-dimensional image are sometimes referred to as "measurement data" in this specification. Order of performing the preparation for standard model and the obtaining of the three-dimensional data is not crucial, and the preparation for standard model and the obtaining of the three-dimensional data may be performed in parallel.

(Rough Alignment)

The standard model and the three-dimensional data are roughly aligned in this step (#13). In order to align the standard model and the three-dimensional data, orientation, size and location of the standard model are changed. The standard model is magnified in the directions X, Y and Z respectively at an arbitrary magnification, so that the size of the standard model in the directions approximates to that of the three-dimensional data.

Figure 6:
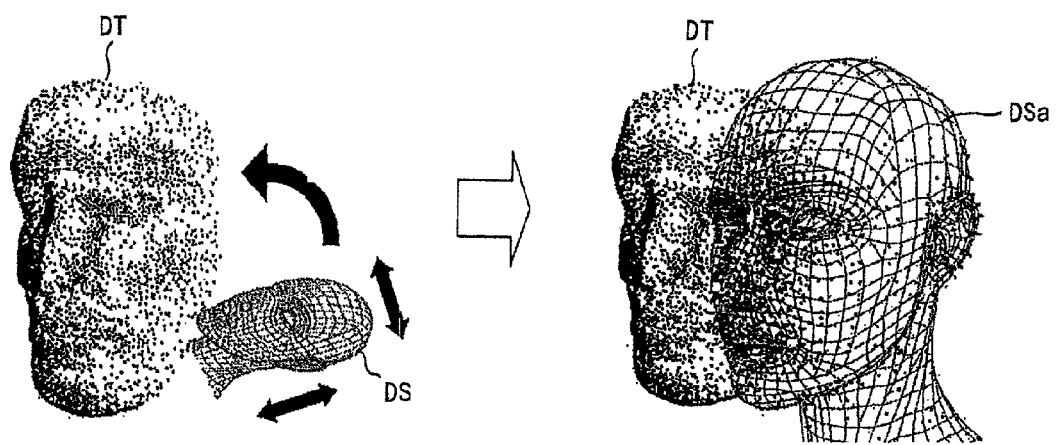
FIG. 6 shows an example of rough alignment.

It is possible to obtain the standard model DSa shown in FIG. 6, which has nearly the same size as the three-dimensional data DT, by rotating and magnifying the standard model DS shown in FIG. 6. In FIG. 6, the standard model and the three-dimensional data are not aligned for the convenience of understanding.

There are practically two methods of alignment, one is (1) general rough alignment and the other is (2) topical rough alignment as explained below.

Method (1) can be performed automatically. A part of method (2) should be manually performed, since it is difficult to perform extraction of characteristic points, which is one of the steps included in method (2). Method (1) is suitable in the case where the sameness of the forms weighs heavily, and method (2) is suitable in the case where sameness of locations is rated above the sameness of forms such as in animation production, from the viewpoint that the standard model is modified topically in the fitting after the rough alignment. Time for the alignment process is effectively shortened by employing method (2) if a user is familiar with the extraction of characteristic points.

(General Rough alignment)

In the general rough alignment, location, orientation and size of the standard model is changed so as to minimize distance between the three-dimensional data and the standard model; i.e., there are determined si, αi and ti when energy function e(si, αi, ti) indicated in the following expression is the smallest.

In the expression, f(si, αi, ti) is an energy function defined in association with the distance between the three-dimensional data and the standard model, and g(si) is a stabilizing energy function for avoiding an excessive modification.

Initial values of the location, direction and size of the standard model may be obtained by performing pattern matching on two-dimensional image obtained at the same time with obtaining the three-dimensional data by means of the three-dimensional measuring unit 16.

$$e(si, \alpha i, ti) = f(si, \alpha i, ti,) + g(si) \quad (1)$$

$$f(si, \alpha i, ti) = \sum_k (d_k(si, \alpha i, ti))^2$$

$$g(si) = \frac{w_{sc}}{s_0}\{(s_1 - s_0)^2 + (s_2 - s_0)^2 + (s_3 - s_0)^2\}$$

wherein,

K: number of construction points of three-dimensional data;

dk: distance between construction point and standard model;

Wsc: weight parameter for stabilizing magnification;

S0: initial scale;

Si: amount of magnification in any one of directions (S3 is a depth);

αi: rotation of standard model in any one of directions; and ti: amount of movement of standard model in any one of directions.

Here, the construction points on the standard model move according to the following expression (2) and distances between the construction points and the surface of the standard model change according to the movements.

$$M_k(si, \alpha i, ti, \chi) = Q_{r3}Q_{r2}Q_{r1}Q_{s\chi} + t \quad (2)$$

χ: coordinate of point of object for modification t: movement vector, t=[$t_1$, $t_2$, $t_3$]

$Q_{ri}$: rotation matrix of χi axis, $$Q_{ri} = \begin{bmatrix} 1 & 0 & 0 \\ 0 & \cos\alpha_1 & \sin\alpha_1 \\ 0 & -\sin\alpha_1 & \cos\alpha_1 \end{bmatrix}$$

and so on.

$$Qs = D\begin{bmatrix} s_1 & 0 & 0 \\ 0 & s_2 & 0 \\ 0 & 0 & s_3 \end{bmatrix}D^T$$

Qs: magnification matrix,

D: conversion matrix from global coordinate.

When the three-dimensional measuring unit 16 performs measurements (capturing) from only one direction, magnification in the depth direction (direction Z) sometimes cannot be precisely measured. In this case, the magnification in the direction Z can be corrected by using magnifications in directions X and Y (Si and S2), as indicated by the expression (3), with considering that there is not a big difference between the form of the three-dimensional data and the form of the standard model.

$$e(si, \alpha i, ti) = f(si, \alpha i, ti) = g(si) \quad (3)$$

$$f(si, \alpha i, ti) = \sum_k d_k^2$$

$$g(si) = \frac{w_{sc}}{s_0}\left\{(s_1 - s_0)^2 + (s_2 - s_0)^2 + \gamma\left[s_3 - \frac{1}{2}(s_1 + s_2)\right]^2\right\}$$

wherein,

γ: weight parameter with respect to modification in the visual line direction x3.

(Topical Rough Alignment)

In the case where the automatic alignment performed 3in the general rough alignment as mentioned above is not successful, the alignment should be performed manually.

The topical rough alignment herein explained is a method wherein the manual alignment is simplified as possible. Unsuccessful alignment should be reset for performing the alignment again from the start.

In the topical rough alignment, correspondences between the characteristic lines or points on the three-dimensional data and the characteristic lines or points on the standard model are detected, and location, direction and size of the standard model are changed in order to minimize distances between them. In the case where correspondence between two lines are detected, perpendicular lines are drawn from a point on one line to another line and points that forms the shortest perpendicular line are set as characteristic points. By repeating such process, a plurality of characteristic points is obtained on the lines.

Specifically, ti, αi and si of the standard model is determined in such a manner that the energy function E(si, αi, ti) represented by the expression (4) becomes the smallest with respect to a distance between a characteristic point on the three-dimensional data and the corresponding characteristic point on the standard model.

$$E(si, \alpha i, ti) = \sum_{k} |M_k(si, \alpha i, ti, \chi) - C_k|^2 \quad (4)$$

wherein, k: number of corresponding characteristic points;

$M_k$: characteristic points on standard model after alignment;

x: characteristic points on standard model before alignment;

$C_k$: characteristic points on three-dimensional data;

si: magnification of standard model in each direction;

αi: rotation of standard model in each direction; and ti: movement of standard model in each direction.

When the three-dimensional measuring unit 16 performs measurements (capturing) from only one direction, magnification in the depth direction (direction Z) sometimes cannot be precisely measured. In this case, the scale in the direction Z can be corrected in the same manner as in the general rough alignment, as indicated by the following expression (5).

$$E(si, \alpha i, ti) = \sum_{k} |M_k(si, \alpha i, ti, \chi) - C_k|^2 + \quad (5)$$
$$\gamma \left[ s_3 - \frac{1}{2}(s_1 + s_2) \right]^2$$

(Extraction of Outlines and Characteristic Point)

Figure 7:
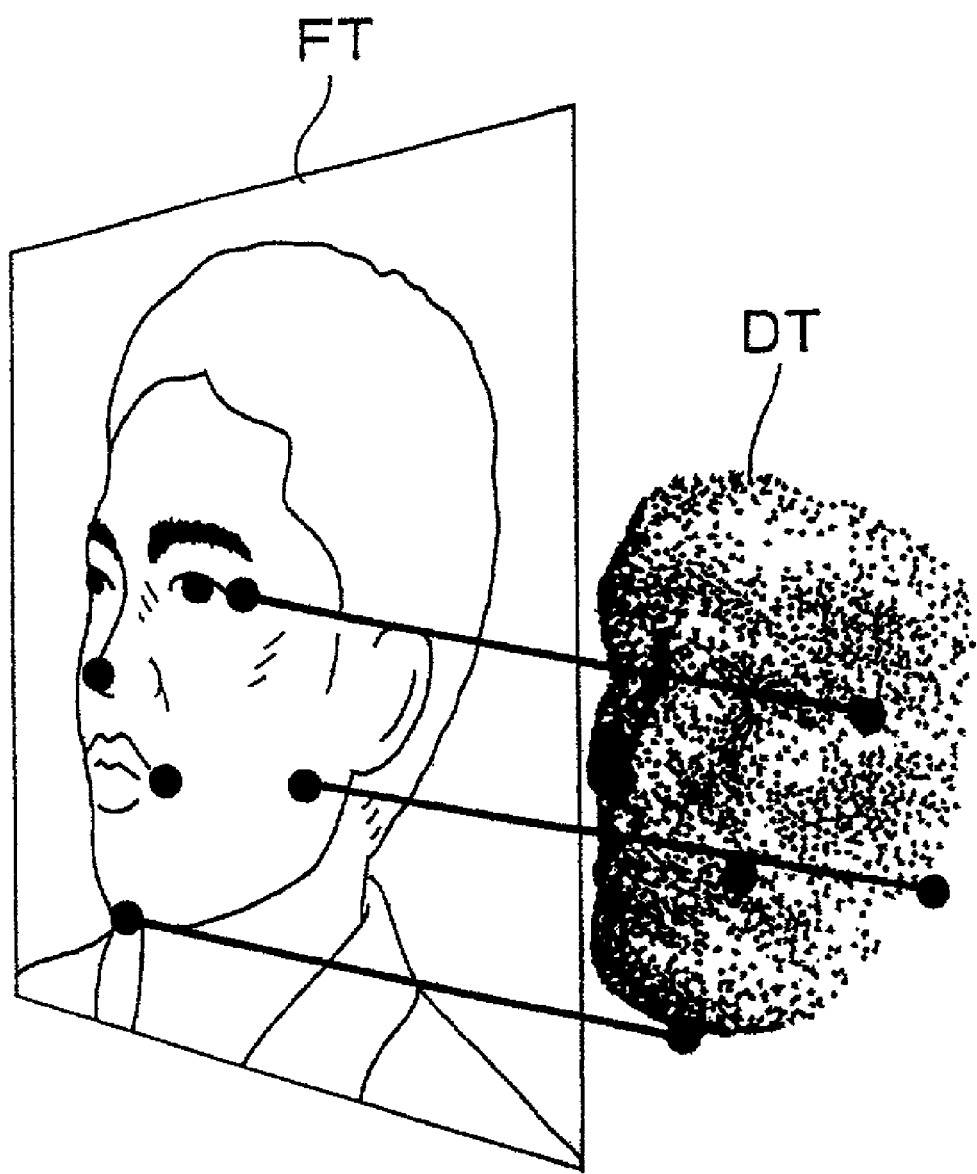
FIG. 7 shows an example of the process of extraction of outlines and characteristic points.

In this step, outlines and characteristic points are extracted on three-dimensional data DT or a two-dimensional image FT (#14). The outlines and characteristic points of a standard model can be extracted in advance of the step #14. In such cases, the outlines and the characteristic points which should be located at the same locations as those of the outlines and characteristic points on the standard model are located on three-dimensional data DT or a two-dimensional image corresponding to the three-dimensional data DT (see FIG. 7).

In the case where the outlines and characteristic points are not extracted in advance, they are assigned on the standard model at the same time when they are located on the three-dimensional data or the two-dimensional image.

(Data Reduction)

Next, in order to reduce number of calculations and errors, reduction of the three-dimensional data is performed by extracting data that are necessary and highly reliable (#15). This data reduction enables to reduce the number of calculations without deforming the form of the original three-dimensional data.

Unnecessary data such as data for outside an object are eliminated in the data reduction. For example, an area for the face of a two-dimensional image is judged in order to maintain only the three-dimensional data corresponding to the area. The area can be judged using differences in the distances from background of the object and parts of the object. The area of the face can be judged by using the rough alignment information. In the case where the reliability data accompanies the three-dimensional data, only the data of high reliability are maintained. When data density is high, some of the data are deleted so that the density is uniform.

In the case of deleting data for making the density uniform, only the data satisfying the following expression (6) are maintained.

$$|Pk - P_{\sim r}| > \frac{r_{det}(Pk) + r_{det}(P_{\sim r})}{2} \quad (6)$$

wherein,

Pk: construction points;

P~r: construction points used previously; and $R_{det}(x)$: function which represents density of periphery of a construction point x.

According to the above expression (6), the data Pk is used if the distance between the data Pr used previously and the data Pk is more than a predetermined value.

(Modification)

In this step, modification of whole of the standard model DS is performed (#16). There are used, to determine a general energy function e, an energy function e1 which is defined in association with the distances between the construction points of the three-dimensional data and the surface of the standard model; an energy function e3 which is defined in association with the distances between characteristic points of the standard model and the characteristic points assigned for the three-dimensional data; an energy function e2 which is defined in association with the distances between the outlines of the standard model and the outlines assigned for the three-dimensional data; and an energy function e2 which is defined to avoid an excessive modification. The general energy function e determined is evaluated. The surface of the standard model is modified in such a manner that the general energy function e becomes the smallest value.

It is preferred to use e1, e2, e3 and es as a general energy function e; however, it is possible to use arbitrarily two functions among e1–e3.

Each of the energy functions will be explained in the following.

(Distance Between Standard Model and Three-Dimensional Data)

Figure 8:
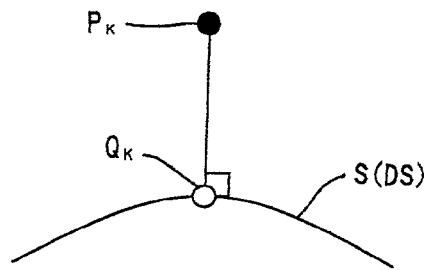
FIG. 8 shows an example of a surface of a standard model and a point of three-dimensional data.

Referring to FIG. 8, the point Pk denotes a point in a point group that is comprised in the three-dimensional data DT.

The point Qk indicated in the surface S of the standard model DS is the nearest point from the point Pk. The point Qk is an intersection point that is found by drawing perpendiculars from the point Pk to the surface S. The distance between the point Pk and the point Qk is evaluated in this step.

The difference energy e1, which represents differences between the points in the three-dimensional data and the surface of the standard model, is determined by the following expression (7) using a square distance of the distance between the point Pk on the three-dimensional data after the data reduction and the point Qk found by projecting the point Pk on the surface S of the standard model DS.

$$e1(T1A) = \frac{1}{WL^2} \sum_k w(pk)[d^{kT}(Qk - Pk)]^2 \qquad (7)$$

wherein,

T1A: control points;

Pk: construction point of three-dimensional data after data reduction;

Qk: projecting point of the construction point of three-dimensional data on the surface of model;

K: number of construction points after data reduction;

dk: direction of projection from construction point to surface of model: $d^k=(Qk-Pk)/|Qk-Pk|$;

ρk: reliability of construction point Pk;

w(ρk): reliability function, $w(\rho k)=1/(\alpha+\rho k)^n$;

W: Σw(ρk); and

L: adjusting scale that enables to handle various energy by one common unit.

(Distance Between Outline of Standard Model and Outline of Measured Data)

In this step, there are evaluated distance between an outline assigned on three-dimensional data or an outline assigned on two-dimensional image and an outline on a standard model.

When the outline of the measured data is assigned on the three-dimensional data, the distance therebetween is determined by drawing perpendiculars from points on the outline of the three-dimensional model to the outline on the standard model which corresponds to the outline of the three-dimensional data and selecting the shortest perpendicular as the distance.

In the case where the outline of the measured data is assigned on the two-dimensional image, the outline of the standard model is projected on the two-dimensional image by using camera parameters for the camera which has captured the two-dimensional image. Distance is determined by drawing perpendiculars from points on the outline of the two-dimensional image to the outline of the standard model that corresponds to the outline of the two-dimensional image and selecting the shortest perpendicular as the distance.

In the case where the outline of the measured data is assigned on the three-dimensional data, e2 which represents difference energy of respective outlines of the standard model is calculated by the following expression (8) using sum of squares of the distances.

$$e2(T2A) = \frac{1}{nl^2} \sum_{k=1}^{n} [d^{kT}(qk - pk)]^2 \qquad (8)$$

wherein,

T2A: control points;

pk: points on outline on three-dimensional data;

qk: pedal point of perpendicular line drawn from point on outline of three-dimensional data to corresponding model outline;

n: number of points on outline of three-dimensional data associated with one model outline;

$d^k$: direction of projection of outline of measured data to corresponding model outline, $d^k=(qk-pk)/|qk-pk|$; and 1: adjusting scale for handling various types of energy by one common unit.

In the case where the outline of the measured data is assigned on the two-dimensional image, e2' which is the difference energy of respective outlines of the standard model is calculated by the following expression (9).

$$e2'(T2'A) = \frac{1}{nl^2} \sum_{k=1}^{n} [d^{kT}(qk - pk)]^2 \qquad (9)$$

wherein,

T2A: control points;

pk: points on outline of two-dimensional image;

qk: pedal point of perpendicular line drawn from point on outline of two-dimensional image to corresponding model outline projected on two-dimensional image;

n: number of points of outline of measured data associated with one model outline;

dk: direction of projection from points on outline of two-dimensional image to corresponding model outline, $d^k=(qk-pk)/|qk-pk|$; and 1: adjusting scale for handling various types of energy by one common unit.

Reason for assigning the outline of the measured data on the two-dimensional image is that the outline itself can be inaccurate if the outline is assigned on the three-dimensional data that are ambiguous. Thus, the outline is extracted using the two-dimensional image.

(Distance Between Characteristic Points on Standard Model and Corresponding Characteristic Points on Measured Data).

Characteristic points are set on the measured data in order to evaluate distances between the characteristic points on the thee-dimensional data or the characteristic points assigned on the two-dimensional image and the characteristic points of the standard model.

Difference energy e3 between the characteristic points on the three-dimensional data and the characteristic points on the standard model is calculated from the following expression (10) by using a square distance of the distance between corresponding characteristic points.

In the case where the characteristic points are assigned on the two-dimensional image, the difference energy on the two-dimensional image is calculated by projecting the characteristic points of the standard model on the two dimensional image using camera parameters.

$$e3(T3A) = \frac{1}{NL^2} \sum_{k=1}^{N} |F^k - G^k|^2 \qquad (10)$$

wherein,

T3A: control points;

Fk: characteristic points of measured data;

Gk: characteristic points on standard model corresponding to characteristic points of measured data;

N: number of correspondences among characteristic points on standard model and characteristic points of measured data; and L: adjusting scale for handling various types of energy by one common unit.

(Stabilization Energy for Avoiding Excessive Modification)

In addition to the difference energy mentioned above, a stabilization energy es is used for avoiding an excessive modification.

Figure 9:
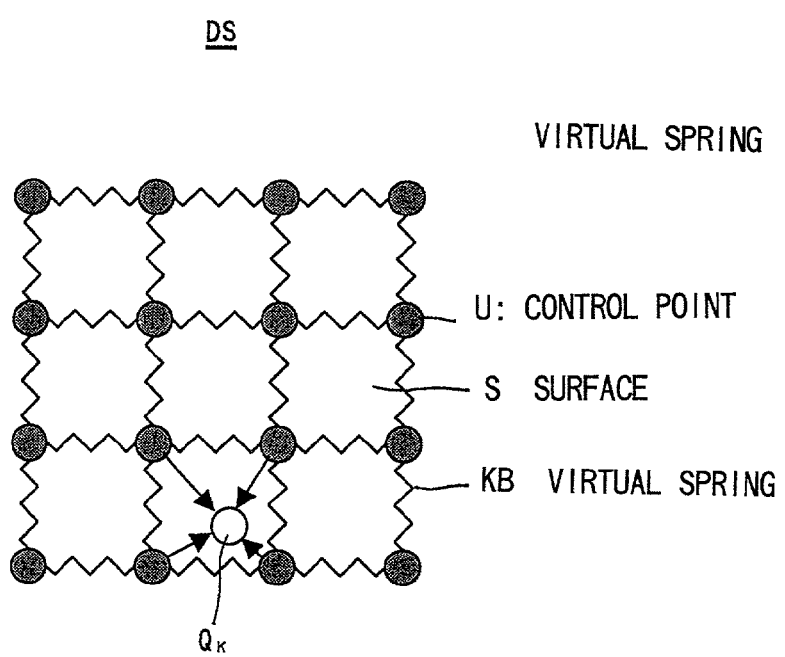
FIG. 9 shows an example of a virtual spring for preventing a standard model from improper modification.

Specifically, distances between control points used for modification are connected by virtual springs (elastic bars) KB as shown in FIG. 9. Based on restrictions of the virtual springs KB, the stabilization energy es for stabilizing the form of the surface S of the standard model DS is defined.

The virtual springs do not necessarily connect the control points, but relationship between the control points and the virtual springs must be definite.

A part of the surface S of the standard model DS, which is an object for fitting, is shown in FIG. 9. The surface S is formed of control points U={ui, i=1 ... N}. A virtual spring KB is provided between neighboring control points. The virtual spring KB restrains the control points by tensile force and serves to prevent the surface S from improper modification.

Specifically, the tensile force of the virtual spring KB is increased with the increase in an interval between neighboring control points U. For example, the tensile force of the virtual spring KB increases when the point Qk approaches the point Pk, and the interval between the control points U increases according to the movement of the point Qk. The tensile force of the virtual spring KB does not change when the movement of the point Qk does not affect the interval of the control points U, i.e., when relative position relationship between the control points U does not change. The stabilization energy es is defined as an average tensile force of the virtual springs KB on the whole surface S. Accordingly, the stabilization es increases when a part of the surface S is excessively modified. The stabilization es is null when the surface S is uniformly modified.

The stabilization energy es is determined by the following expression (11) according to the state of deformation of the virtual spring KB.

$$es(TsA) = \frac{c}{ML^2} \sum_{m=1}^{M} \left[ \frac{1}{L_0^m} (U \sim m - V \sim m)^T (Um - Vm) - L0m \right]^2 \qquad (11)$$

wherein,

T3A: control points;

U~m, V~m: initial value of edge (control point) of virtual spring;

Um, Vm: edge of virtual spring after modification;

L0m: length of virtual spring in initial state, $L0m = |U\sim m - V\sim m|$

M: number of virtual springs;

c: spring coefficient; and

L: adjusting scale for handling various types of energy by one common unit.

Therefore, the virtual spring KB is hardly deformed if the spring coefficient c is large.

The stabilization energy function es serves as a certain restraint for modification of the surface S and thus enables to prevent the surface S from an excessive modification.

(General Energy Function)

As described in the foregoing, the control points T1A, T2A, T3A and TsA are used for the energy functions e1, e2, e3 and e4, respectively. Although the identical control points T1A–TsA are used in the foregoing, control points different from one another can be used as mentioned below. The standard model is modified using the different control points TA, and the control points TA as represented by the expression (12) which can minimize the general energy function e(TA) is determined.

$$e(TA) = w1e1(TA) + \sum_s w2e2^s(TA) + w3e3(TA) + ces(TA) \qquad (12)$$

wherein, e1(T1A): difference energy between construction points of three-dimensional data and surface of model;

e2²(T2A): difference energy between model outline and outline of measured data;

e3(T3A): difference energy between characteristic point of measured dta and characteristic point of model;

eS(TSA): stabilization energy for avoiding excessive modification;

wi, c: weight parameter for respective energy; and

TA=T1A=T2A=T3A=TSA.

(Repetitive Modification)

In actuality, the modification is performed repeatedly (#17). Specifically, the same step as the step 16 is repeated after changing control points to perform modification. The modification can be performed by changing the energy functions instead of changing the control points. Assuming that the general energy function at n time(s) of modification is en(TA), the general energy function en(TA) is considered to be converged when the following expression is satisfied.

$$|en(TA) - en-1(TA)| < \epsilon. \qquad (13)$$

Figure 3:
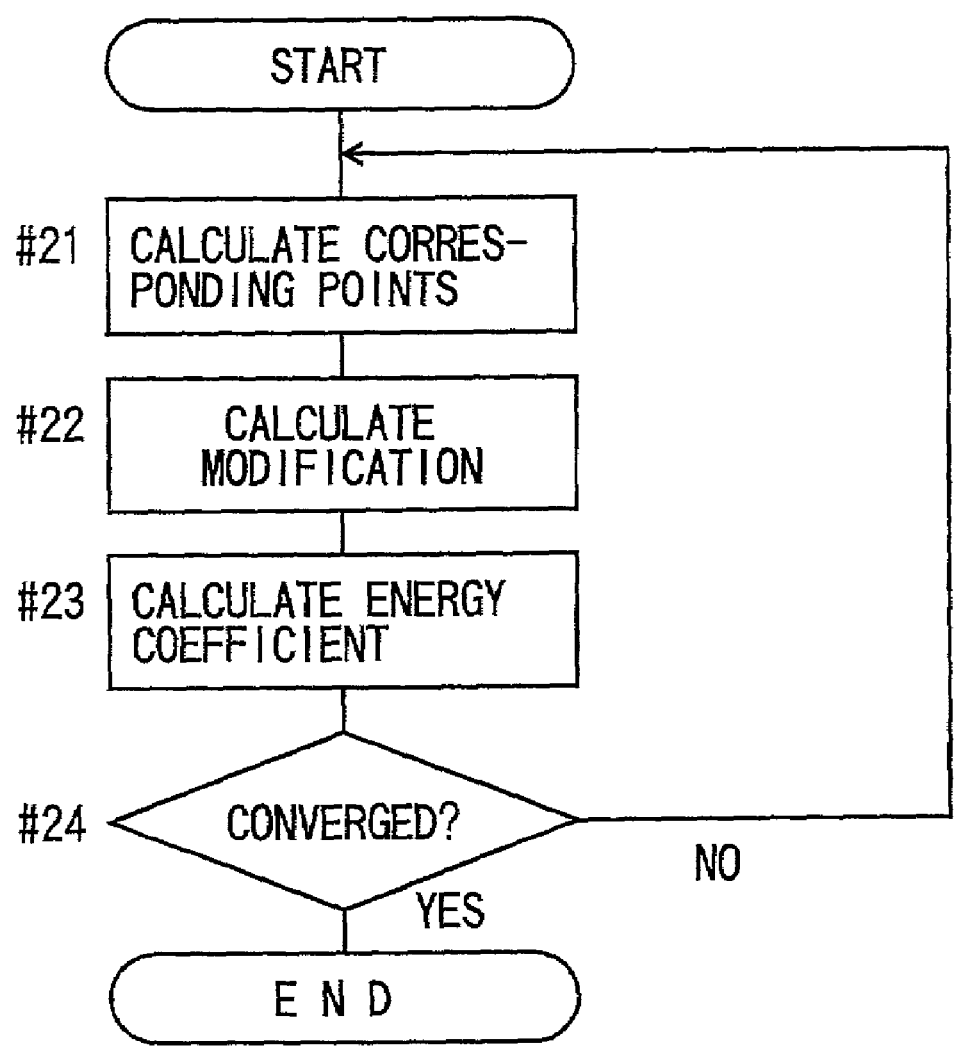
FIG. 3 is a flow chart showing the modification process.

Hereinafter, a general modification process is explained with reference to FIG. 3. Firstly, a pair of corresponding points between the measured data and the standard model is prepared (#21). For example, the point Qk that corresponds to the point Pk shown in FIG. 8 is calculated and determined to prepare a pair of the points Pk and Qk.

The surface S is modified (#22), and the general energy function en(TA) after the modification is calculated (#23). Until the general energy function en(TA) is converged (until it is "YES" in #24), the process is repeated.

There may be employed a known method for judging the convergence of the general energy function en(TA) such as a method wherein the convergence is confirmed when the general energy function en(TA) is smaller than a predetermined value and a method wherein the convergence is confirmed when degree of change from the previous calculation is smaller than a predetermined value.

(Different Control Points)

In the expression (12), the same control points are used for the different energy functions e1–e4 having different objects for fitting (e.g., construction points of three-dimensional data, outline, characteristic point). In turn, control points are varied for each object for fitting, i.e., for each energy functions in the following example. Specifically, in the following example, different control points T1A, T2A, T3A and TSA are used.

In this case, the expression (12) can be used as the general energy function e(TA) as long as the control points T1A, T2A, T3A and TSA are different from one another and in the following relationship.

TA ⊃ T1A

TA ⊃ T2A

TA ⊃ T3A

TA=TSA

As mentioned above, movement due to energy between the control points is topical in nature since the control points are topical (as points usually are). For example, in aligning the position of an eye of three-dimensional data and the position of an eye of a standard model, undesired modification may occur if a part where characteristic points are set is strongly pulled. Such undesirable modification should be avoided.

In turn, the construction points of the three-dimensional data need to be located to realize delicate movement. However, in the case where the control points are scarcely set, the construction points cannot move delicately.

Therefore, it is preferred to use a large number of control points with respect to the construction points of the three-dimensional data and a small number of control points with respect to the characteristic points. An intermediate number of control points are used for the outline.

The control points are set with high density for an outline that has a steep or jagged form. The stabilization energy must be applied to all the control points. The selection of control points as mentioned above is performed in preparation for the standard model.

The control points T1A, T2A, T3A and TSA are different from one another; however, control points included in each of the T1A, T2A, T3A and TSA can be used in common.

(Change in Weight Depending on Reliability)

In the expression (12), the general energy function e(TA) is evaluated assuming that reliabilities of information are equal to one another; however, in this example, weights are changed depending on the reliabilities of the information. Thus, it is possible to judge e(TA) with counting strongly the information of high reliability.

The reliability of respective information can be obtained in the three-dimensional measurement or automatic extraction of outlines and characteristic points.

In this case, control points (TA) which can minimize the general energy function e(TA) represented by the expression (14) is determined.

$$e(TA) = w1W1(\rho1)e1(TA) + \sum_s w2W2(\rho2s)e2s(TA) + \qquad (14)$$

-continued
$$w3W3(\rho3)e3(TA) + ces(TA)$$

wherein,

ρi: reliabilities of information regarding respective energy functions ei(TA);

W(i): reliability function; and

TA=T1A=T2A=T3A=TSA.

Fitting with weighting based on the reliability will hereinafter be described in more detail.

Fitting energy function Ef(U) for a point Pk in a point group, a point Qk corresponding to the point Pk and corresponding points T={(Pk, Qk), K=1 . . . n} may be set as in the following expression (15), for example.

$$Ef(U) = \sum_i \|Pk - Qk(U)\|^2 \qquad (15)$$

wherein, Qk(U) indicates that Qk is a function of U.

Stabilization energy function Es(U) is represented by the following expression (16). The expression (16) corresponds to the expression (11).

$$Es(U) = \frac{c}{M} \sum_{m=1}^{M} \left[ \frac{1}{L_0^m} (n \sim_1^m - n \sim_2^m)^T (n_1^m - n_2^m) - L_0^m \right] \qquad (16)$$

Evaluation function E(U) of fitting is defined as the following expression (17) using the fitting energy function Ef(U) and the stabilization energy function Es(U).

$$E(U)=WfEf(U)+WsEs(U) \qquad (17)$$

In the above expression, each of Wf and Ws is a weight coefficient used for normalization.

The fitting of a surface is performed by repeating modification of the surface and search for corresponding point so that the evaluation function E(U) of the expression (17) becomes satisfactorily small. For example, the surface is moved in the fitting to the direction in which differential of U of the evaluation function E(U) approaches to null.

The evaluation function E(U) described above is obtained by assuming that the reliabilities of the points are equal to one another and handling the reliabilities of points of a point group as equal to one another. Weighting based on the reliability of the point Pk is conducted with respect to the evaluation function E(U).

Specifically, in the case where the fitting energy function represented by the expression (15) is used, an undesirable fitting result may sometimes be introduced as being affected by the points of low reliability since the data for all the points Pk cannot be fully reliable. However, in the case where the point Pk of low reliability is deleted, a point group in which the point Pk is deleted may not be able to maintain the original form thereof.

Therefore, elements of the reliabilities of points Pk in a point group is introduced to the expression (15) as weights of corresponding relationships to obtain the following expression (15').

$$Ef(U) = \sum_i w(\rho k)\|Pk - Qk(U)\|^2 \qquad (15')$$

In the above expression (15'), ρk represents the reliability of the point Pk. It is possible to use the above-mentioned reliability data as the reliability ρk. W(ρk) is a function for determining the weight from the reliability ρk.

Generally, in the case where x represents reliability of a point, W(x) is a function which serves to assign a weight to the point depending on its reliability. For example, large weight is assigned if the reliability x is high (when value of x is small), and small weight is assigned if the reliability x is low (when value of x is large). Such function can be obtained by the following expression (18).

$$W(x) = 1/(1+x)^n \qquad (18)$$

In the expression (18), n is a weighting coefficient for the reliability, and x>0.

For example, in the case of using number of pixels which is the reliability data as the reliability x, x=0 and the weight W(x)=1 if there is no shift. When x=1, the weight W(x) is $\frac{1}{2}^n$; and when x=2, the weight W(x) is $\frac{1}{3}^n$. When the reliability decreases (when value of x increases), the weight W(x) approaches to null. Thus, the surface is modified in accordance with the reliability of each of the points Pk.

When the expression (15') is used as a fitting energy function Ef(U) in the expression (17), more precise fitting is performed with respect to the point Pk of high reliability and fitting with respect to the point of low reliability is performed is such a manner as to avoid affecting to the fitting with respect to the point of high reliability.

Figure 18A:
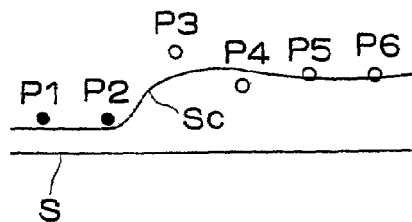
FIGS. 18A and 18B are examples of fittings of a surface S to a point P.
Figure 18B:
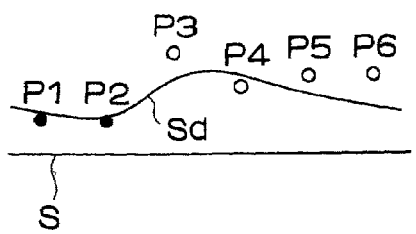
Figure 19A:
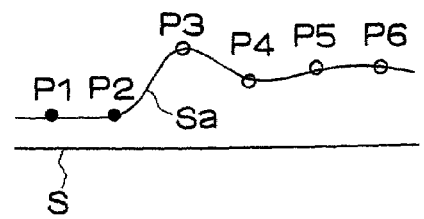
FIGS. 19A and 19B are examples of conventional fittings of a surface S to a point P.
Figure 19B:
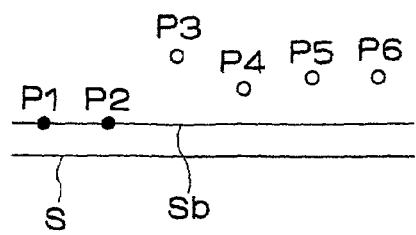

For example, referring to FIGS. 18A and 18B, in the case where the points P1 and P2 have high reliabilities and points 3 to 6 have low reliabilities among the six points of points 1 to 6, the surface S is modified in accordance with the reliabilities of the points 1 to 6. In the surfaces Sc and Sd modified according to the present embodiment, the form formed of a point group reflects the reliabilities of the points, the form of the point group is maintained and excessive modification is suppressed as compared to the surface Sa in FIG. 19A which is modified without considering the reliabilities of the points and the surface Sb in FIG. 19B which is modified with deleting the points of low reliability.

As described above, the degree of fitting of a surface to the point group comprising a set of points Pk is changed based on the reliability information of the points Pk according to the present embodiment. The present embodiment thus prevents improper modification or erroneous modification even when points of low reliabilities are included in a point group, thereby to achieve a proper fitting.

Further, since the modification of surface is performed depending on reliabilities of points Pk without deleting points of low reliabilities as mentioned above, the modification reflects an original form of a point group. Thus, the present invention achieves more proper fitting than that of the conventional method of deleting the points of low reliabilities.

Although reliabilities of points of a point group is judged and then a weight of each of the points is changed based on the judgment in the present embodiment, it is also possible to judge the reliabilities by a predetermined area comprised in a point group and then change weights of all the points existing in the area at once based on the judgment.

(Partial Area Modification)

By the steps #1 to #17, it is possible to obtain a three-dimensional model more elaborated and precise than that obtained by the conventional method. However, process of the steps #1 to #17 is performed with respect to the whole part of an object and, therefore, a fitting with respect to a part of the object having topical characteristics may not sometimes be satisfactorily precise. Accordingly, the characteristic part of the object or a part with respect to which a fitting have not been performed satisfactorily in the steps #1 to #17 is extracted from three-dimensional data, and a fitting is performed using the extracted three-dimensional data (#18).

Figure 11:
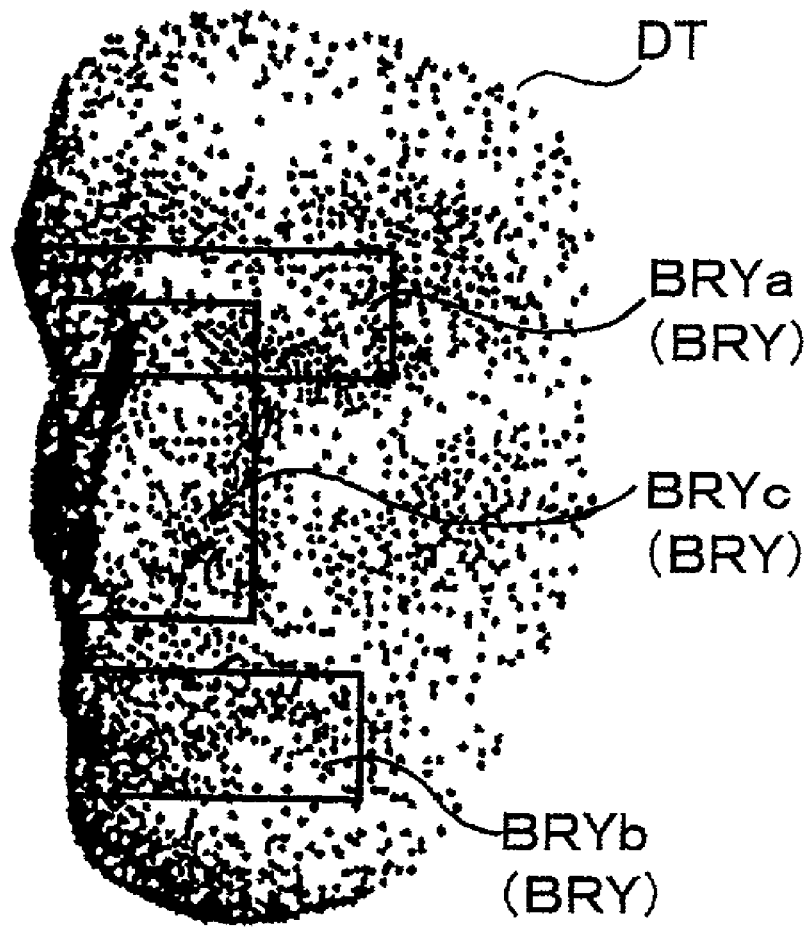
FIG. 11 shows an example of extraction of partial areas.

FIG. 11 is an example of the extraction of partial areas BRY, and FIG. 12 is an example of a method for modifying a standard model DS using the partial areas BRY.

Referring to FIG. 11, the partial areas BRY are extracted from three-dimensional data DT. The partial areas BRYa, BRYb and BRYc are three-dimensional data of the eyes and the periphery, the mouth and the periphery and the nose and the periphery, respectively, which are extracted from three-dimensional data DT of an object. The partial areas BRY may be reduced in data when so required. The data reduction can be performed in the same manner as that of the step #15. Since fitting area is limited to the partial areas BRY in a modification of partial area described below, the right-hand side of the expression (6) is made closer to null than that of the step #15 to lower the data reduction rate; therefore, the fitting process does not take time even in the case of maintaining a certain level of precision of the partial areas BRY. Therefore, it is possible to set the data reduction rate of each of the partial areas BRY considering a region of the partial area BRY, required precision and process time. The extraction of the partial areas BRY may be conducted either in the step #12, i.e., when obtaining the three-dimensional data or after the process of the steps #1 to #17 is completed.

Referring to FIG. 12, process of partial area modification of the standard model DS1 indicated at the left-hand side is shown in the standard models DS1a and DS1b at the right-hand side.

In the step #18, the standard model DS1 obtained by the steps #1 to #17 is subjected to fitting using the BRYa as shown in the center of FIG. 12 in order to obtain the standard model DS1a. The fitting in the step #18 is performed in the same manner as that of the step #16, i.e., by modifying the standard model and repeating the modification. In the step #18, there may be settled, depending on the partial areas BRY, a suitable value for each of the control points T1A, the point Pk and the Point Qk in the expression (7); the control points T2A, the point pk and the point qk in the expressions (8) and (9); the control points T3A, the point Fk and the Point Gk in the expression (10); the control points TsA, the point U~m and the Point V~m in the expression (11); the threshold value E of the expression (13) or the like.

The partial area modification is performed successively for each of the partial areas BRY (#18 and "YES" in the step #19). Control points and the like are varied for each of the partial areas BRY, so that fitting of the standard model DS1 can be more precisely performed.

For example, after obtaining the standard model DS1a, fitting is performed using the partial area BRYb to obtain the standard model DS1b. The standard model DS1b thus obtained is the target three-dimensional model ML.

Each of the partial areas BRY may be overlapped with a part of other partial areas BRY or included in any of other partial areas BRY. For example, referring to FIG. 11, a part of the partial area BRYa may be overlapped with a part of the partial area BRYc, or a partial area modification of the partial area BRYb may be performed followed by an extraction of data of the upper lip as a new partial area and then a partial area modification for the new partial area.

The extraction of partial areas may be conducted either by an operator (manually) or by performing the partial area selection process in the modeling program PR as shown in FIG. 1. In the latter instance, an area corresponding to a part to be extracted as a partial area is defined in a standard model in advance of the extraction. Then, an area of three-dimensional data corresponding to the standard model modified by the process of the steps #11 to #17 is judged as the partial area to be extracted.

According to the embodiment described above, the fitting of a standard model is followed by the partial fitting of the standard model using the partial areas, so that fitting of topical areas such as the eyes or the mouth can be performed more precisely without causing improper modification. Thus, it is possible to generate a three-dimensional model that closely resembles to an object.

(Generation of Skeleton Model)

The model for skin of a standard model is modified to generate a skin model of a three-dimensional model by the above process. Referring to FIGS. 13 to 17, a method for generating a skeleton model MLB by modifying a model for skeleton DSB will be explained below.

As mentioned above, the model for skin, the model for skeleton and the model for muscle of a standard model have control points in common. Accordingly, the control points set on the standard model are changed if the model for skin DSA is modified for generating the skin model MLA. The control points of the skin model MLA, i.e., the control points after modification are the modification information or modification result in the present invention.

(Generation of Skeleton Model by Adopting Modification Information)

The model for skeleton DSB is modified using modification information to generate the skeleton model MLB as shown in FIGS. 13 to 17.

Specifically, the model for skeleton DSB is modified by using the control points ThA set on the standard model DS and the control points TA after modification. Here, "h" in the abbreviation "ThA" denotes "hat" and indicates that the model is not yet modified. This is applicable to the abbreviations appearing in the following such as "VhQ" and "VhR".

Point group (construction point group) Vhq forming the model for skin DSA before modification can be represented by the following expression (19) as a linear joint of the control points ThA.

$$V^Q(T^A) = \alpha_A{}^Q T^A \quad (19)$$

wherein, VhQ: point group forming model for skin DSA;

αAQ: coefficient that depends on each point of point groups BhQ and ThA, $\alpha AQ = fA(VhQ)$; and ThA: control points before modification.

The construction point group VQ of the model for skin DSA after the modification is represented by the following expression (20).

$$V^Q(T^A) = \alpha_A{}^Q T^A \quad (20)$$

The construction point group VhR of the model for skeleton DSB before modification is represented by the following expression (21).

$$V^R(T^A) = \alpha_A{}^R T^A \quad (21)$$

wherein, VhR: point group for forming model for skeleton DSB;

αAR: coefficient that depends on each of point groups VhA and ThA, $\alpha AR = fA(VhR)$; and ThA: control points before modification.

The coefficient αAR is determined by the above expression (21).

The construction point group VR of the model for skeleton DSB after modification (skeleton model MLB) is represented by the following expression (22).

$$V^R(T^A) = \alpha_A{}^R T^A \quad (22)$$

The coefficient αAR determined above and the control point group TA of the model for skin DSA after modification are substituted with the right-hand side of the expression (22). This substitution enables to obtain the construction point group VR of the model for skeleton DSB after modification by that very simple operation and thus eliminates the complicated operation as performed in the modification of the model for skin DSA.

(Correction in Adoption of Modification Information)

The modification information (i.e., the control point group TA after modification) is taken out of the model for skin DSA after modification and used for modifying the model for skeleton DSB in order to generate the skeleton model MLB as described above. In this case, improper modification may occur when then modification information is adopted as it is since the model for skin DSA and the model for skeleton DSB are not identical.

For example, referring to FIG. 13, the standard model DS comprises the model for skin DSA and the model for skeleton DSB; the model for skin DSA has many construction points Q; and the model for skeleton DSB has many construction points R. Further, the model for skin DSA and the model for skeleton DSB have control points U (A, B, C and D) in common.

Here, only three control points U which are closest respectively to the construction points Q and R are used for each of the model for skin DSA and the model for skeleton DSB. Accordingly, each of the construction points is controlled by the three closest control points and not influenced by any other control points. Specifically, for example, each of the coefficient αAQ and αAR of any other control points is set as null.

The control points U (A, B, C) are used for the construction point Q1 of the model for skin DSA. However, the construction point R2 of the model for skeleton corresponding to the construction point Q1 of the model for skin DSA is not the control points U (A, B, C), but control points U (A, B, D). Proper modification may not be performed if such control points are used.

For example, in the case where the control points U(B) move upwards and control points U(D) move downwards, the construction point Q1 of the model for skin moves upwards but the construction point R2 of the model for skeleton DSB moves downwards. However, the construction point Q1 and R2 are corresponding points for the skin and skeleton and it is necessary that they move in the same direction. The irregular movement may deform the form of the model.

To avoid such deformation, correction of control points U is performed with respect to each of the construction points that are objects for modification. The correction may be performed by the following two methods.

One of the methods employs the construction point Q on the model for skin DSA that is closest to the construction point Q of the model for skeleton instead of using the construction point R for determining the coefficient a as shown in FIG. 14.

Specifically, in FIG. 14, the construction point Q1 on the model for skin DSA closest to the construction point Q1 of the model for skeleton DSB is used instead of using the construction point R2. By setting a certain correspondence between the construction point R2 and construction point Q1, it is possible to use the control points U of the construction point Q1 as the control pints U of the construction point R2. In this case, the distance between the construction point R2 and the construction point Q1 is ignored.

The same control points are thus used for the model for skin DSA and the mode for skeleton DSB, so that the improper modification mentioned above can be prevented.

Another method employs a point RQ, instead of using the construction point R of the model for skeleton DSB, which is obtained by projecting the construction point R on the skin model MLA.

Specifically, the modification information is adopted to the model for skeleton DSB. In this case, the control point group VhR of the model for skeleton DSB before modification is represented by the following expression (23) instead of the expression (21).

$$V^{RQ}(T^A) = \alpha_A^{RQ} T^A \tag{23}$$

wherein, VhRQ: point group obtained by projecting point group forming model for skeleton DSB on model for skin MLA;

$\alpha ARQ$: coefficient depending on each points of point group VhR, ThA and point group VhQ, $$\alpha ARQ = fA(VhRQ); \text{ and}$$

ThA: control point group before modification.

The coefficient $\alpha ARQ$ is determined by the expression (23) and a construction point group VR of the model for skeleton DSB after modification (skeleton model MLB) is determined by the following expression (24).

$$V^R(T^A) = \alpha_A^{RQ} T^A \tag{24}$$

In the example shown in FIG. 15, the construction point R2 of the model for skeleton DSB is projected on the skin model MLA. Specifically, perpendiculars is drawn from the construction point R2 of the model for skeleton DSB to the skin model MLA, and an intersection (nodal point) of the shortest perpendicular is determined as a virtual construction point RQ2'. Control points U for the virtual construction point RQ2' are used as the control points U for the construction point R2.

Such correction can prevent an unwanted modification.

Following is an explanation for general process of generating a three-dimensional model.

Figure 16:
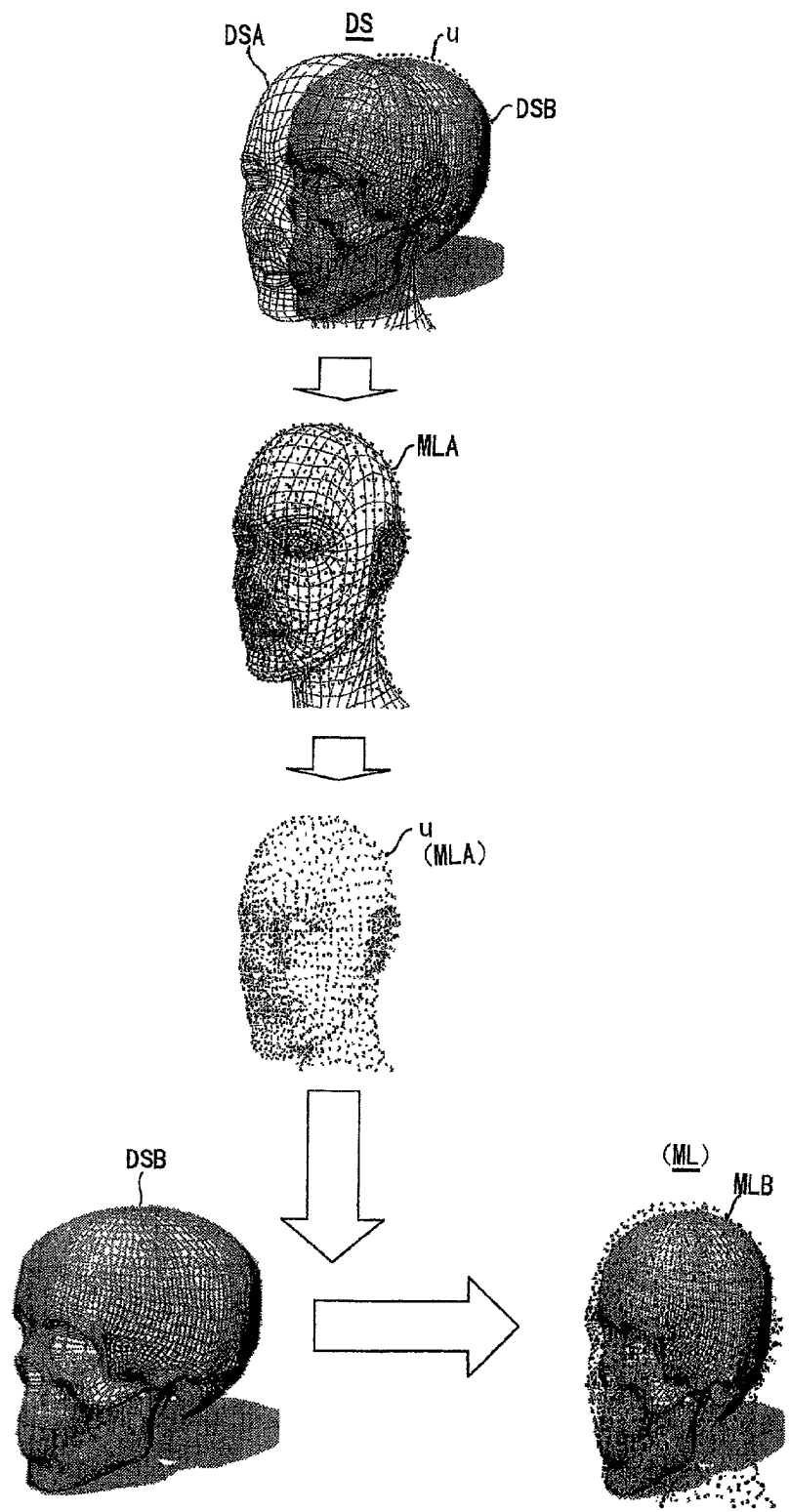
FIG. 16 is an example of generation of a three-dimensional model by modifying a model for skin and a model for skeleton.

Referring to FIGS. 16 and 17, standard model DS containing at least two models is prepared (#1). In this step, each of the models has control points u in common.

The model for skin DSA is fitted to three-dimensional data and modified in order to be used as skin model MLA (#2). Control points u are then extracted from the skin model MLA (#3). Model for skeleton DSB is modified by using the control points u (#4). The control points u used for the modification of the model for skeleton DSB have been corrected before the modification. The skeleton model MLB and the skin model MLA thus obtained are combined to form the three-dimensional model ML.

The skeleton model MLB is generated by using the modification information of the skin model MLA in the above example, and the same method is applicable to generation of a muscle model MLC. Further, the above-mentioned method may be used for modifying two models corresponding to each other.

More specifically, in the case where the standard model DS comprises a first model and a second model, the first model may be subjected to a fitting to three-dimensional data so as to be modified (first step), and modification information obtained by the modification in the first step is used for modifying the second model (second step).

If the standard model comprises three-dimensional information such as muscle information, the same modification as mentioned above can be performed. Muscle is formed of lines that are arranged three-dimensionally and, therefore, the muscle information is information comprising three-dimensional lines.

According to the above embodiment, a three-dimensional model such as a skin model and a skeleton model is obtainable by performing a fitting using three-dimensional data obtained by measuring an object and modifying a model for skin and a model for skeleton. It is possible to prevent abnormal modification from occurring by correcting modification information in this embodiment.

Further, in the above embodiment, the configuration of the modeling unit 1, the circuit, the contents of process, the order of process, the timing of process, the setting of coefficient and the like can be changed according to the scope and spirits of the present invention.

What is claimed is:

1. A method for fitting a surface to a point group using a computer, comprising the steps of:
    a first step for judging reliability of the point group and
    a second step for changing the method for fitting the surface to the point group based on a result of the judgment of reliability obtained in the first step.

2. The method according to claim 1, wherein
    the first step comprising judging reliabilities of points composing the point group, and
    the second step comprising changing the method for fitting the surface to the point group by varying a weight of each of the points based on the reliability of each of the points.

3. The method according to claim 1, wherein
    data indicating reliabilities of the point group and the points are obtained by three-dimensional measurements.

4. A device for fitting a surface to a point group using a computer, comprising:
    an obtaining section for determining reliability of each of points composing the point group and
    a modifying section for varying a degree of the fitting of the surface to the point group depending on the reliabilities.

5. The device according to claim 4, comprising:
    a weighting section for assigning a weight for each of the points based on the reliability of each of the points, wherein the modifying section changes a degree of the fitting of the surface to the point group depending on the weights.

6. The device according to claim 4, wherein the surface has been prepared in advance of the fitting.

7. The device according to claim 4, wherein an amount of data for the surface is smaller than that of the point group.

8. The device according to claim 4, wherein the data of the surface includes attribute information associated with form information.

9. The device according to claim 8, wherein the data of the surface represents a form of a face, and the attribute information represents characteristic parts of the face.

10. A system comprising:
a measuring unit for measuring a distance therefrom to a plurality of points on a surface of an object;
a calculator for calculating reliabilities of respective distances of the measured distances;
a processor for modifying prepared data which represents a three-dimensional form using the reliabilities so that a three-dimensional form represented by the modified data resembles a form of the object.

11. A computer program product for fitting a surface to a point group comprising a computer readable storage medium having a computer program stored thereon for performing:
a first step for judging a reliability of the point group and
a second step for changing the method for fitting the surface to the point group based on a result of the judgment of reliability obtained in the first step.

12. A processor comprising:
an obtaining section for obtaining original data generated by measurements;
a first modifying section for modifying a first standard model based on the obtained data, the first standard model being previously prepared independently of the obtaining of original data; and
a second modifying section for modifying a second standard model based on an effect of the modification of the first standard model, the second standard model being relative to the first standard model,
wherein
the first standard model has a first construction point group and is modified in accordance with movement of the first construction point group,
the second standard model has a second construction point group and is modified in accordance with movement of the second construction point group,
the first construction point group is defined in association with a first control point group,
each of the control points of the first control point group is in association with the plural construction points of the first construction point group,
the first construction point group moves with movement of the first control point group that is defined in association with the first construction point group,
the second construction point group is defined in association with a second control point group,
each of the control points of the second control point group is in association with the plural construction points of the second construction point group,
the second construction point group moves with movement of the second control point group that is defined in association with the second construction point group, and the second control point group is a part of the first control point group.

13. The processor according to claim 12, wherein the control points for moving the construction points of the second standard model are corrected when adopting a result of the modification of the first standard model.

14. A processor comprising:
an obtaining section for obtaining original data generated by measurements;
a first modifying section for modifying a first standard model based on the obtained data, the first standard model being previously prepared independently of the obtaining of original data; and
a second modifying section for modifying a second standard model based on an effect of the modification of the first standard model, the second standard model being relative to the first standard model, wherein
the first standard model has a plurality of construction points corresponding to which a plurality of control points are defined,
the second standard model has a plurality of construction points corresponding to which some of the control points defined by the first standard model are defined,
the first standard model is modified in accordance with movements of the construction points which move in accordance with movements of the control points,
the second standard model is modified in accordance with movements of the construction points which move in accordance with movements of the control points, and
defined as control points corresponding to the construction points of the second standard model are control points corresponding to construction points among the construction points of the modified first standard model which are the closest to the construction points of the second standard model.

15. A processor comprising:
an obtaining section for obtaining original data generated by measurements;
a first modifying section for modifying a first standard model based on the obtained data, the first standard model being previously prepared independently of the obtaining of original data; and
a second modifying section for modifying a second standard model based on an effect of the modification of the first standard model, the second standard model being relative to the first standard model, wherein
the first standard model has a plurality of construction points corresponding to which a plurality of control points are defined,
the second standard model has a plurality of construction points corresponding to which some of the control points defined by the first standard model are defined,
the first standard model is modified in accordance with movements of the construction points which move in accordance with movements of the control points,
the second standard model is modified in accordance with movements of the construction points which move in accordance with movements of the control points, and
defined as control points corresponding to construction points of the second construction points are control points corresponding to points obtained by projecting the construction points of the second standard model on the first standard model.

16. A process comprising the steps of:

obtaining original data generated by measurements;

modifying a first standard model based on the obtained data, the first standard model being previously prepared independently of the obtaining of original data; and modifying a second standard model based on an effect of the modification of the first standard model, the second standard model being relative to the first standard model, wherein the first standard model has a first construction point group and is modified in accordance with movement of the first construction point group, the second standard model has a second construction point group and is modified in accordance with movement of the second construction point group, the first construction point group is defined in association with a first control point group, each of the control points of the first control point group is in association with the plural construction points of the first construction point group, the first construction point group moves with movement of the first control point group that is defined in association with the first construction point group, the second construction point group is defined in association with a second control point group, each of the control points of the second control point group is in association with the plural construction points of the second construction point group, the second construction point group moves with movement of the second control point group that is defined in association with the second construction point group, and the second control point group is a part of the first control point group.

17. A modeling device for generating a three-dimensional model comprising:

a selection section for selecting a plurality of partial areas from measurement data obtained by measuring an object and a modifying section for modifying a three-dimensional model based on a measurement data of each of the selected partial areas, wherein the modifying section performs modification with respect to the standard model based on the whole measurement data before performing modification based on the measurement data of each of the partial areas.

\* \* \* \* \*